Aug. 20, 1940.  C. C. BROWN  2,211,846

VALVE

Filed Nov. 26, 1937

C. C. BROWN  INVENTOR.

BY J. Vincent Martin
and
Ralph R. Browning
ATTORNEYS.

Patented Aug. 20, 1940

2,211,846

UNITED STATES PATENT OFFICE 2,211,846

VALVE

Cicero C. Brown, Houston, Tex.

Application November 26, 1937, Serial No. 176,413

5 Claims. (Cl. 137—69)

This invention relates to check valves, and more particularly has reference to a check valve for use in a well tubing in a position to permit flow into the tubing but prevent flow out of the tubing at a point intermediate the tubing ends.

In an oil well tubing, it is frequently desirable to provide a lateral opening into the tubing adjacent its lower end so that flow into the tubing may be permitted. However, for obvious reasons, it is not desirable that this opening be such as to permit outflow therethrough.

The need for such a valve might arise under various circumstances, one of which is during the time that the tubing or other pipe is being lowered into a well with a check valve on its lower end to prevent upflow, as is frequently the case when tubing or pipe is to be used as a wash pipe and strainer setting tool. Under such circumstances, if no provision is made for lateral flow into the tubing it is necessary to keep filling the tubing with liquid as it is lowered to keep it from being crushed by the pressure of the liquid standing in the well. With the valve here contemplated, however, liquid will enter the tubing through the lateral valve before the pressure becomes great enough to damage the tubing.

Attempts have been made to provide check valves for lateral openings such as just referred to, which check valves would permit inflow but prevent outflow through these openings. However, most of these have taken the form of flap valves opening inwardly into the tubing, with the obvious result that they would tend to partially obstruct the passageway through the tubing and would tend to be moved toward open position by flow through the tubing. Furthermore, they have been of such a nature that they would easily become clogged with sand, mud or other debris that might happen to be in the flow of fluid through the tubing, and when so clogged they would be useless as check valves.

It is a general object of this invention to provide a new and improved check valve for controlling lateral flow into a well tubing.

It is a more specific object of this invention to provide a check valve of the type referred to which will not obstruct the passage through the tubing, which will not tend to be opened by flow through the tubing and which will not become easily clogged by debris in the fluid passing therethrough.

Other objects and advantages of this invention will become apparent from the following description, taken in connection with the accompanying drawing, it being understood that the same are by way of illustration and example only, and not by way of limitation:

Figure 1:
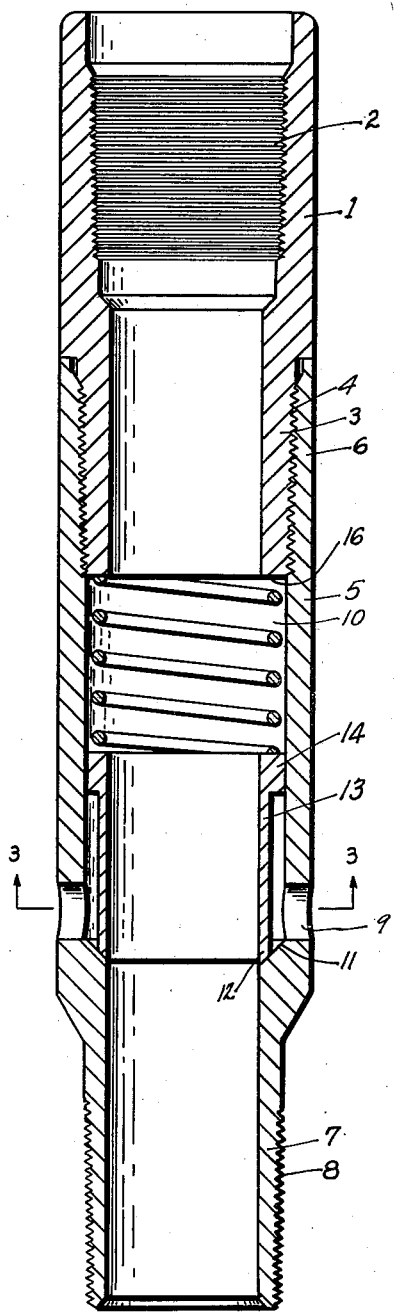
Fig. 1 is a view in vertical cross section through a section of tubing and a valve constructed in accordance with this invention, the valve being shown in closed position.

Referring now more particularly to the drawing, the numeral 1 designates a special fitting having an internally threaded box section 2 at its upper end adapted to receive the end of a section of tubing, having a pin section 3 at its lower end externally threaded at 4 to receive the upper end of a special fitting 5 having an upper internally threaded section 6.

The lower end of the fitting 5 is formed with a reduced internal and external diameter as shown at 7, which is externally threaded at 8 to receive a collar on the upper end of a section of tubing.

Just above the section 7 of reduced diameter the fitting 5 is provided with lateral openings 9, the upper section of this fitting having a relatively large internal diameter as indicated at 10. This section of relatively large internal diameter terminates at its lower end in an inclined shoulder forming a valve seat 11 adapted to receive the lower end 12 of a sleeve valve 13. The external diameter of this sleeve valve 13 is appreciably less than the internal diameter of the part 10 of section 5, except that at its upper end the sleeve valve 13 is formed with an external flange 14 fitting snugly within the portion 10 of large internal diameter. Above the sleeve valve 13 and interposed between the flange 14 and the end of the pin section 3 is a spring 15 acting at all times to urge the sleeve valve toward its seated position as illustrated in Fig. 1 of the drawing.

So long as the pressure outside of the tubing just described is less than the pressure inside of the tubing, or some other predetermined pressure, this sleeve valve 13 will remain in its seated position as illustrated in Fig. 1 and flow through the tubing in either direction, will not cause it to leave its seat. Neither will it obstruct flow through the tubing in any manner because the passageway through the tubing remains fully open at all times.

Figure 2:
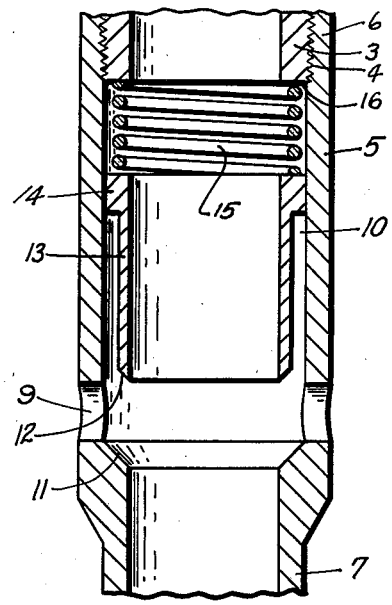
Fig. 2 is a similar view illustrating a portion of the structure in Fig. 1 and showing the valve in open position.
Figure 3:
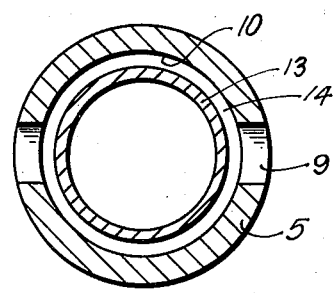
Fig. 3 is a horizontal cross section of the device shown in Fig. 1 taken along the line 3—3 of Fig. 1.

When the pressure outside the tubing exceeds by a predetermined amount the pressure within the tubing, then the pressure outside the tubing, acting through the openings 9 upon the undersurface of the flange 14, will overcome the tension of the spring 15, and the pull of gravity on the sleeve 13 and will cause this sleeve to rise to a position such as illustrated, for example, in Fig. 2. Whereupon, flow into the tubing through the openings 9 will be freely permitted. It is worthy of note, however, that even when in an open position, the passageway through the tubing is in nowise obstructed and that the flow through the tubing has at best only a negligible influence upon the movement or stability of sleeve valve 13.

Furthermore, it will readily be seen that because of the construction of this sleeve valve and the fact that it has a frusto-conical seating surface against which it is urged by a spring and not simply by its own weight, this valve will be unlikely to become clogged or otherwise rendered inoperative because of debris of any kind in the fluid passing therethrough.

All of the objects and advantages sought by this invention have thus been accomplished in a thoroughly practical manner.

Having described my invention, I claim:

1. In combination, a tubing section having a portion of enlarged internal diameter with lateral openings therethrough, an annular valve seat adjacent one end of said section, a sleeve valve within said portion for controlling said openings and of smaller external diameter than the internal diameter of said portion, said sleeve valve having a lateral flange extending outwardly from its end opposite said valve seat, and a spring having an internal diameter not less than the internal diameter of said valve seat for constantly urging said sleeve valve toward said seat.

2. In combination, a tubing section having a portion of enlarged internal diameter with lateral openings therethrough, an annular valve seat adjacent one end of said section, a sleeve valve within said portion of smaller external diameter than the internal diameter of said portion for controlling said openings, said sleeve valve having a lateral flange extending outwardly from its end opposite said valve seat, and a spring for constantly urging said sleeve valve toward said seat.

3. In combination, a tubing section having a portion of enlarged internal diameter with lateral openings therethrough, an annular valve seat adjacent one end of said section, a sleeve valve within said portion of smaller external diameter than the internal diameter of said portion for controlling said openings, said sleeve valve having a lateral flange extending outwardly from its end opposite said valve seat, and snugly fitting within portion, and a spring for constantly urging said sleeve valve toward said seat.

4. In combination, a tubing section having a portion with a lateral opening therethrough, an annular valve seat within said portion and longitudinally spaced from said opening, and a sleeve valve within said portion of smaller external diameter than the internal diameter of said portion for controlling said opening, said sleeve valve having a lateral flange extending outwardly from its end opposite said valve seat.

5. In combination, a tubing section having a portion with a lateral opening therethrough, an annular valve seat within said portion and longitudinally spaced from said opening, a sleeve valve within said portion of smaller external diameter than the internal diameter of said portion for controlling said opening, said sleeve valve having a lateral flange extending outwardly from its end opposite said valve seat, and a spring for constantly urging said sleeve valve toward said seat.

CICERO C. BROWN.